United States Patent
Nakagawa (10) Patent No.: US 8,593,335 B2
(45) Date of Patent: Nov. 26, 2013

(54) METHOD AND DEVICE FOR PROCESSING ECHO SIGNAL, RADAR DEVICE AND ECHO SIGNAL PROCESSING PROGRAM

(75) Inventor: Kazuya Nakagawa, Nishinomiya (JP)

(73) Assignee: FURUNO Electric Company Limited, Nishinomiya (JP)

( * ) Notice: Subject to any disclaimer, the term of this patent is extended or adjusted under 35 U.S.C. 154(b) by 382 days.

(21) Appl. No.: 13/013,218

(22) Filed: Jan. 25, 2011

(65) Prior Publication Data
US 2011/0205104 A1    Aug. 25, 2011

(30) Foreign Application Priority Data
Feb. 23, 2010    (JP) ................. 2010-036885

(51) Int. Cl.
*G01S 13/08* (2006.01)
*G01S 13/00* (2006.01)

(52) U.S. Cl.
USPC ........... 342/159; 342/145; 342/175; 342/176; 342/179; 342/189; 342/195

(58) Field of Classification Search
USPC ......... 342/145, 147, 158–164, 175, 176, 179, 342/189, 195–197
See application file for complete search history.

(56) References Cited

U.S. PATENT DOCUMENTS

| | | | | |
|---|---|---|---|---|
| 3,797,014 A | * | 3/1974 | Tompkins et al. | 342/90 |
| 3,831,174 A | * | 8/1974 | King et al. | 342/90 |
| 4,005,415 A | * | 1/1977 | Kossiakoff et al. | 342/90 |
| 4,339,754 A | * | 7/1982 | Hammers et al. | 342/89 |
| 4,489,320 A | * | 12/1984 | Lewis et al. | 342/94 |
| 4,555,703 A | * | 11/1985 | Cantrell | 342/13 |
| 4,630,052 A | * | 12/1986 | Galati et al. | 342/159 |
| 4,665,401 A | * | 5/1987 | Garrard et al. | 342/75 |
| 4,780,720 A | * | 10/1988 | Watts | 342/91 |
| 4,782,343 A | * | 11/1988 | Marchais | 342/160 |
| 4,837,579 A | * | 6/1989 | Pease et al. | 342/197 |
| 4,940,988 A | * | 7/1990 | Taylor, Jr. | 342/93 |
| 5,097,268 A | * | 3/1992 | Bauer et al. | 342/160 |
| 5,351,055 A | * | 9/1994 | Fujikawa et al. | 342/184 |
| 5,471,878 A | * | 12/1995 | Chiao et al. | 73/602 |
| 5,485,157 A | * | 1/1996 | Long | 342/160 |
| 5,652,594 A | * | 7/1997 | Costas | 342/162 |
| 5,805,106 A | * | 9/1998 | Baum | 342/159 |

(Continued)

FOREIGN PATENT DOCUMENTS

JP    11-352212 A    12/1999

*Primary Examiner* — Jack W Keith
*Assistant Examiner* — Peter Bythrow
(74) *Attorney, Agent, or Firm* — Birch, Stewart, Kolasch & Birch, LLP (57) ABSTRACT

A method includes inputting an echo signal from an antenna for discharging an electromagnetic wave to a predetermined area and receiving an echo signal reflected on a target object, outputting a level of the echo signal from every location so as to associate the level with a distance from the antenna in an azimuth direction where the electromagnetic wave is discharged, calculating a degree of change in the level of the echo signal from mutually adjacent locations among all the locations concerned, performing edge emphasis processing for the level of the echo signal in the azimuth direction based on the degree of change and outputting an edge-emphasized echo signal, and performing scan-to-scan correlation processing to calculate a correlation value of the echo signals of two or more scans using the edge-emphasized echo signals, where the echo signals from the entire predetermined area is used as one scan.

22 Claims, 8 Drawing Sheets

(56) References Cited

U.S. PATENT DOCUMENTS

| | | | |
|---|---|---|---|
| 6,078,281 A * | 6/2000 | Milkovich et al. | 342/196 |
| 6,198,429 B1 * | 3/2001 | Fujikawa et al. | 342/176 |
| 6,311,108 B1 * | 10/2001 | Ammar et al. | 701/16 |
| 6,677,886 B1 * | 1/2004 | Lok | 342/26 R |
| 7,230,565 B2 * | 6/2007 | Nakanishi et al. | 342/70 |
| 7,423,581 B2 * | 9/2008 | Fujikawa et al. | 342/159 |
| 7,456,780 B1 * | 11/2008 | Garren | 342/25 A |
| 7,834,805 B2 * | 11/2010 | Fujikawa et al. | 342/179 |
| 8,264,395 B2 * | 9/2012 | Fujikawa et al. | 342/26 R |
| 8,310,392 B2 * | 11/2012 | Kojima et al. | 342/185 |
| 8,405,545 B2 * | 3/2013 | Kojima | 342/185 |
| 2006/0082493 A1 * | 4/2006 | Fujikawa et al. | 342/159 |
| 2006/0109168 A1 * | 5/2006 | Nakanishi et al. | 342/70 |
| 2006/0145914 A1 * | 7/2006 | Fujikawa et al. | 342/185 |
| 2006/0170587 A1 * | 8/2006 | Kai | 342/70 |
| 2007/0008210 A1 * | 1/2007 | Kibayashi et al. | 342/70 |
| 2007/0120730 A1 * | 5/2007 | Takano et al. | 342/70 |
| 2007/0194983 A1 * | 8/2007 | Stove | 342/185 |
| 2008/0030401 A1 * | 2/2008 | Kojima et al. | 342/185 |
| 2008/0169974 A1 * | 7/2008 | Fujikawa et al. | 342/179 |
| 2008/0266171 A1 * | 10/2008 | Weber et al. | 342/123 |
| 2009/0027257 A1 * | 1/2009 | Arikan et al. | 342/159 |
| 2010/0207809 A1 * | 8/2010 | Fujikawa et al. | 342/26 R |

* cited by examiner

METHOD AND DEVICE FOR PROCESSING ECHO SIGNAL, RADAR DEVICE AND ECHO SIGNAL PROCESSING PROGRAM

CROSS-REFERENCE TO RELATED APPLICATION(S)

The application claims priority under 35 U.S.C. §119 to Japanese Patent Application No. 2010-036882, which was filed on Feb. 23, 2010, the entire disclosure of which is hereby incorporated by reference.

TECHNICAL FIELD

The present invention relates to a method and device for carrying out various processing to an echo signal, as well as to a radar device and a echo signal processing program.

BACKGROUND

Conventionally, when displaying images of measured target objects (echo images) on a display screen, radar devices suppress echoes which are not generated continuously at the same location (sea clutters, etc.), and perform scan-to-scan correlation processing for emphasizing echoes of the target objects (see JP11-352212A).

However, since an echo level varies according to conditions of a transmission pulse, problems such as a contour of a target object fades even if a scan-to-scan correlation is performed may arise. In particular, because weighted addition processing is performed in the technique of JP11-352212A, contours of stationary target objects may also fade due to changes, errors or the like of echo levels of movable target objects.

SUMMARY

Therefore, the present invention provides a method and device for processing an echo signal, that eliminates a blur resulting from a condition of a transmission pulse to clearly display a contour of a target object, and a radar device and a echo signal processing program.

According to one aspect of the invention, an echo signal processing device is provided, which includes an echo signal input module to which an echo signal from an antenna for discharging an electromagnetic wave to a predetermined area and receiving an echo signal reflected on a target object is inputted, an echo signal level detecting module for outputting a level of the echo signal from every location so as to associate the level with a distance from the antenna in an azimuth direction where the electromagnetic wave is discharged, a level change degree calculating module for calculating a degree of change in the level of the echo signal from mutually adjacent locations among all the locations concerned, and an edge emphasis processing module for performing edge emphasis processing for the level of the echo signal in the azimuth direction based on the degree of change and outputting an edge-emphasized echo signal. The present invention further comprises a correlation processing module for performs scan-to-scan correlation processing to calculate a correlation value of the echo signals of two or more scans using the edge-emphasized echo signals, where the echo signals from the entire predetermined area is used as one scan.

The device can eliminate a blur resulting from conditions of a transmission pulse to clearly display the contour of a target object.

The scan-to-scan correlation processing may include processing to calculate the correlation value of the echo signals based on a correlation between a first echo signal caused by the electromagnetic wave discharged from the antenna at a first time point, and the edge-emphasized echo signal outputted from the edge emphasis processing module for the level of the echo signal observed as an observation signal at substantially the same location as the first echo signal, caused by the electromagnetic wave discharged from the antenna at a second time point different from the first time point.

The scan-to-scan correlation processing may include processing to calculate the correlation value of the echo signals based on a correlation between a first edge-emphasized echo signal outputted from the edge emphasis processing module for a level of a first echo signal caused by the electromagnetic wave discharged from the antenna at a first time point, and a second edge-emphasized echo signal outputted from the edge emphasis processing module for the level of the echo signal observed as an observation signal at substantially the same location as the first echo signal, caused by the electromagnetic wave discharged from the antenna at a second time point different from the first time point.

The device may further include a memory module for storing an output signal from the correlation processing module. The scan-to-scan correlation processing may include processing to calculate the correlation value of the echo signals based on a correlation between a first edge-emphasized echo signal outputted from the edge emphasis processing module for the level of a first echo signal caused by the electromagnetic wave discharged from the antenna at a first time point, and a signal after the past scan-to-scan correlation processing stored in the memory module.

The degree of change in the echo signal may be a difference of the levels of the echo signals at mutually adjacent locations.

The degree of change in the echo signal may be a differential value calculated by differentiating to an envelope formed of the level of the echo signal, with respect to an azimuth direction.

The degree of change in the echo signal may be a value calculated by weighted addition processing for the level of the echo signal at the location concerned and its surrounding locations.

The edge emphasis processing may include processing for multiplying the level of the echo signal of each of the locations by a coefficient determined based on the degree of change.

The edge emphasis processing may be performed when the degree of change in the echo signal exceeds a predetermined threshold.

The device may further include a display module for displaying an image of the target object based on an output signal of the correlation processing module.

According to another aspect of the invention, a radar device is provided, which includes the echo signal processing device, and the antenna for rotating while discharging the electromagnetic wave and receiving the echo signal for every azimuth direction.

The radar device can eliminate a blur resulting from conditions of a transmission pulse to clearly display the contour of a target object.

According to another aspect of the invention, a method of processing an echo signal is provided, which include inputting an echo signal from an antenna for discharging an electromagnetic wave to a predetermined area and receiving an echo signal reflected on a target object, outputting a level of the echo signal from every location so as associate the level with a distance from the antenna in an azimuth direction where the electromagnetic wave is discharged, calculating a degree of change in the level of the echo signal from mutually adjacent locations among all the locations concerned, performing edge emphasis processing for the level of the echo signal in the azimuth direction based on the degree of change and outputting an edge-emphasized echo signal, and performing scan-to-scan correlation processing to calculate a correlation value of the echo signals of two or more scans using the edge-emphasized echo signals, where the echo signals from the entire predetermined area is used as one scan.

The method can eliminate a blur resulting from conditions of a transmission pulse to clearly display the contour of a target object.

According to another aspect of the invention, an echo signal processing program, executable by a computer, is provided, the program includes inputting an echo signal from an antenna for discharging an electromagnetic wave to a predetermined area and receiving an echo signal reflected on a target object, outputting a level of the echo signal from every location so as to associate the level with a distance from the antenna in an azimuth direction where the electromagnetic wave is discharged, calculating a degree of change in the level of the echo signal from mutually adjacent locations among all the locations concerned, performing edge emphasis processing for the level of the echo signal in the azimuth direction based on the degree of change and outputting an edge-emphasized echo signal, and performing scan-to-scan correlation processing to calculate a correlation value of the echo signals of two or more scans using the edge-emphasized echo signals, where the echo signals from the entire predetermined area is used as one scan.

The program can eliminate a blur resulting from conditions of a transmission pulse to clearly display the contour of a target object.

In the above aspects of the invention, typically, a portion of the contour of the target object near the ship is the part where the degree of change in the echo level between adjacent points (a change of values between samples) is relatively large (where the echo level rises sharply). Measurement data of this rising edge portion is information which does not largely change even if transmission pulse conditions such as a pulse length change. Therefore, by performing the scan-to-scan correlation after performing the edge emphasis processing, the blur resulting from the conditions of the transmission pulse can be eliminated and the contour of the target object can be clearly displayed.

The degree of change can be calculated based on the difference value between the samples in each azimuth direction and the differential value of the envelope. Moreover, it can also be calculated by weighted addition with surrounding locations for each sample (spatial filter processing).

For the technique of the edge emphasis, for example, the original measurement data may be multiplied by the coefficient according to the differential value to perform the weighting. Furthermore, the edge portion may be extracted. For example, for the portion where the difference value is more than a predetermined threshold, the measurement data is left as it is, and for other portions, the measurement data is set to 0, to extract the edge portion.

The scan-to-scan correlation may be processing in which the correlation between the data after the current edge emphasis processing and the past measurement data (the measurement data for which the edge emphasis processing is not performed) is calculated, or may be processing in which the correlation between the measurement data for which the edge emphasis processing by the differential value is performed and the measurement data for which processing for extracting the edge portion is performed is calculated.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
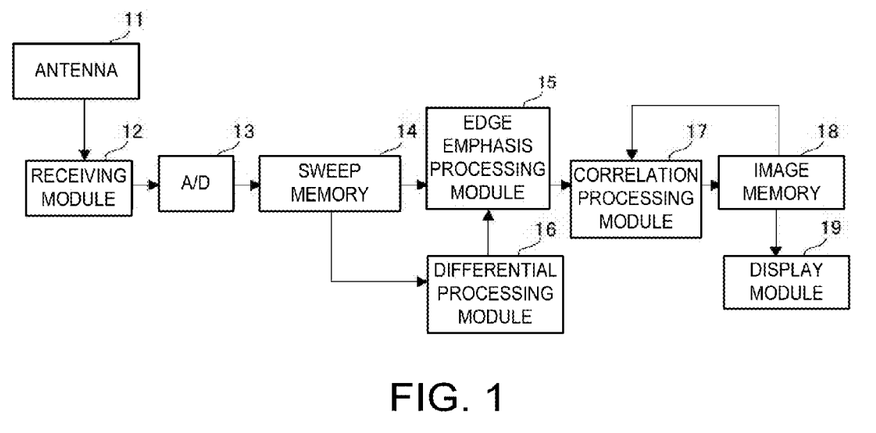
FIG. 1 is a block diagram showing a configuration of a radar device according to one embodiment of the invention.

FIG. 1 is a block diagram showing a configuration of a radar device that equips a built-in image processing device according to one embodiment of the present invention. For example, the radar device is installed in a ship, and transmits and receives an electromagnetic wave around the ship to detect a target object, such as another ship.

As shown in FIG. 1, the radar device includes an antenna 11, a receiving module 12, an A/D converter 13, a sweep memory 14, an edge emphasis processing module 15, a differential processing module 16, a correlation processing module 17, an image memory 18, and a display module 19.

The antenna 11 discharges electromagnetic waves around the ship (a predetermined area), and receives echo signals reflected on target objects. The receiving module 12 outputs a value according to the receiving intensity of the antenna 11 to the A/D converter 13. The A/D converter 13 carries out a digital conversion of the receiving intensity of the inputted analog value, and outputs it to the sweep memory 14 as measurement data.

The sweep memory 14 stores the measurement data for one measurement cycle (360° around the ship). Each measurement data is associated with coordinates of a polar coordinate system, and is stored as sweep data. Because the antenna 11 transmits and receives the electromagnetic wave of a pulse shape at a predetermined angle, the sweep data is stored for each transceiving angle (each azimuth direction) of the antenna 11 as a discrete value X(t) of every predetermined sample t (every location). The sweep data represents the echo signals around the ship (echo signals for one scan).

The edge emphasis processing module 15 and the differential processing module 16 read out the sweep data from the sweep memory 14, and perform various processing. First, the differential processing module 16 performs differentiation processing of the sweep data, and calculates a degree of change of the echo level at mutually adjacent locations for every location. Differentiation data is generated by calculating a difference value between respective samples in a distance direction so that it is expressed by $d(t)=X(t)-X(t-1)$, for example. If X(t) takes a value ranging from 0 to 255 (8 bits), d(t) will be a value ranging from −255 to 255. Alternatively, the differentiation data d(t) may be a differential value with respect to each azimuth direction for an envelope formed by the echo level of each sample. Moreover, the differentiation data may be generated by averaging the echo levels at each location and its surrounding locations (weighted addition). For example, spatial filter processing using such as a Sobel filter or a Laplacian filter may be performed to each sample.

Next, the edge emphasis processing module 15 multiplies the sweep data inputted from the sweep memory 14 by a coefficient (edge emphasis coefficient μ) according to each value of the differentiation data obtained by the differential processing module 16. That is, processing that can be expressed by $$\hat{X}(t) = \mu \cdot X(t)$$

is performed. The edge emphasis coefficient μ can be expressed by $$\mu = \frac{d(t)}{2 \cdot d\max} + 0.5.$$

The value dmax is a maximum value of the differentiation data d(t), and because $$\mu = \frac{d(t)}{2 \cdot d\max}$$

represents a ratio between dmax and the maximum value, it takes a value ranging from −0.5 to 0.5.

Therefore, the edge emphasis coefficient μ takes a value ranging from 0 to 1. Because the edge emphasis coefficient μ takes a larger value as the value of the differentiation data d(t) becomes larger, the edge emphasis processing data $\hat{X}(t)$ is data weighted according to a rising edge of the echo level. That is, the edge emphasis processing data emphasizes a portion near the ship among the edge of each target object.

Then, the edge emphasis processing module 15 converts the edge emphasis processing data in the polar coordinate system into a rectangular coordinate system in which a position of the ship is set as the origin, and outputs it to the correlation processing module 17.

The correlation processing module 17 calculates a correlation between the data inputted from the edge emphasis processing module 15 and the data of the past read from the image memory 18 on the output side, and performs processing for outputting the correlation to the image memory 18 as new data. That is, the correlation processing module 17 calculates a correlation between current data Xn inputted from the edge emphasis processing module 15 and data Yn−1 after the scan-to-scan correlation processing of one antenna revolution before read from the image memory 18 (weighted addition between the echo signals observed as observation signals at substantially the same location), calculates data Yn after the current scan-to-scan correlation processing, and outputs it to the image memory 18.

The data after this scan-to-scan correlation processing is stored in the image memory 18 as an image brightness value (image data) of respective coordinates in the rectangular coordinate system for one antenna revolution.

The display module 19 displays the image data stored in the image memory 18 as a radar image (echo image) for a user.

With reference to FIGS. 2A and 2B, 3A and 3B, 4, 5A and 5B, and 6A to 6C, differences in the echo images between a conventional radar device and the radar device of this embodiment are described.

Figure 2A:
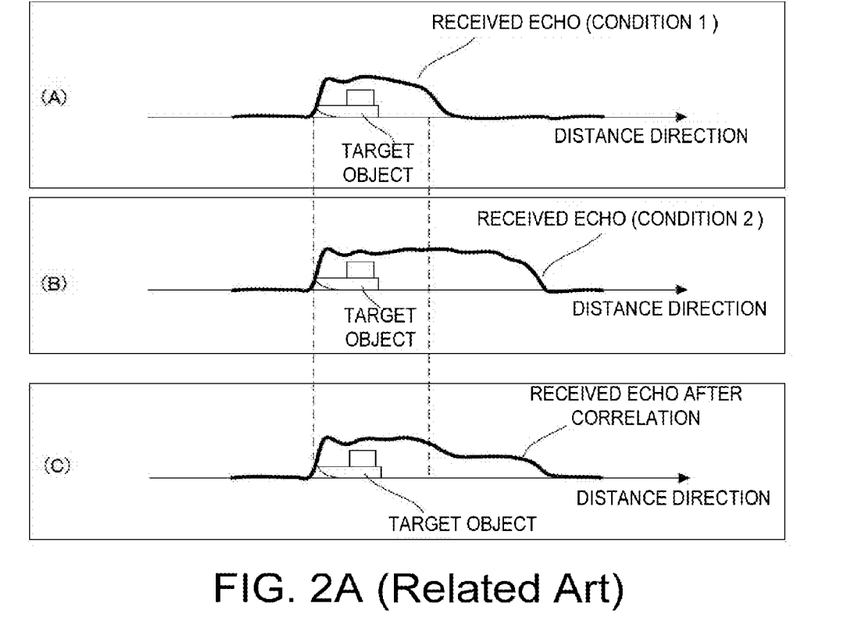
FIG. 2A is views illustrating various signals of a conventional radar device.
Figure 2B:
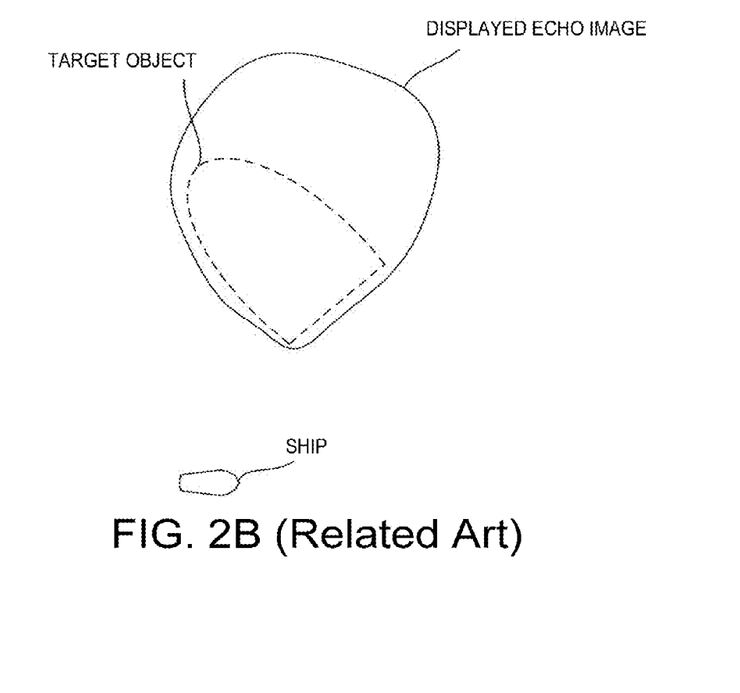
FIG. 2B is a schematic diagram showing an echo image of the conventional radar device.

First, as shown in the part (A) and the part (B) of FIG. 2A, in the conventional radar device, when conditions of the transmission pulse changes, a level of the echo signal (characteristics in a distance direction) changes. Therefore, if the correlation processing is performed, the echo signal spreads in the distance direction as shown in the part (C) of FIG. 2A, and an echo image which spreads in the distance direction is displayed as shown in FIG. 2B. That is, a distance direction resolution is reduced and the faded echo image is displayed. Here, a distance resolution d can be expressed by $d=c\cdot\tau/2$ (c is a speed of light and τ is a transmission pulse length), and since the distance resolution does not change even if a sampling period Ts is shortened and/or the scan-to-scan correlation is performed, the echo image with such a blurred contour cannot be corrected by the conventional technique.

Figure 3A:
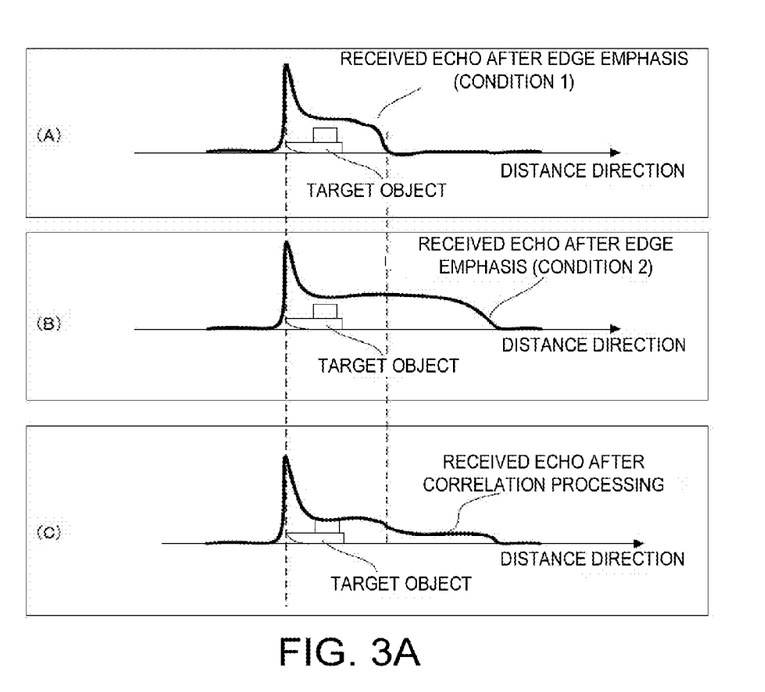
FIG. 3A is views illustrating various signals of the radar device of this embodiment.
Figure 3B:
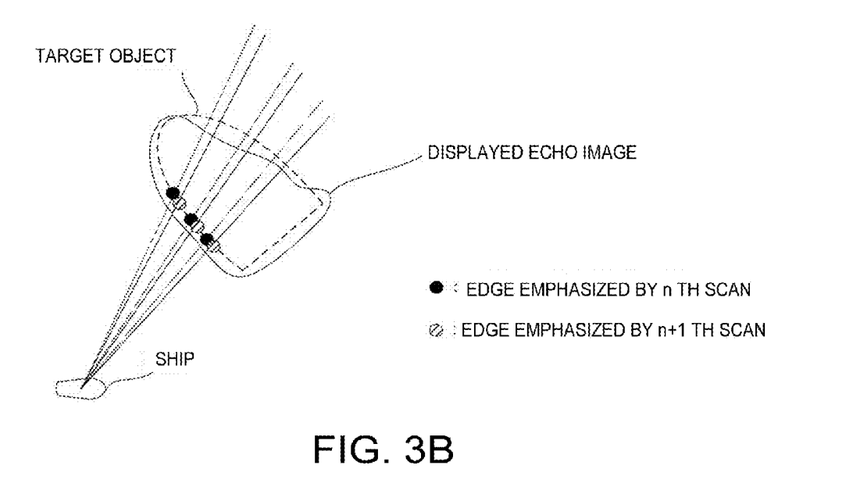
FIG. 3B is a schematic diagram showing an echo image of the radar device.

On the other hand, the radar device of this embodiment performs the edge emphasis processing by weighting according to the rising edge of the echo level, and further performs the scan-to-scan correlation with the past data using the measurement data after this edge emphasis processing. Thereby, the portion near the ship among the contour of each target object is emphasized, and other portions are suppressed. That is, as shown in the part (A) and the part (B) of FIG. 3A, the radar device of this embodiment emphasizes the portion of each target object near the ship by the edge emphasis processing. The contour portion of the target object near the ship is a portion where a degree of change in the value between the samples is relatively large (where the echo level rises sharply). The measurement data of this rising edge portion is information which does not change much even if the pulse length changes, and does not change much for every scan unlike the measurement data corresponding to a rear portion of the target object. Therefore, as shown in the part (C) of FIG. 3A, by performing the scan-to-scan correlation processing, the level of portions other than the edge is relatively lowered, and the spread in the distance direction is suppressed. For this reason, as shown in FIG. 3B, by performing the scan-to-scan correlation after the edge emphasis processing is performed, the spread (blur) in the distance direction resulting from the conditions of the transmission pulse is suppressed, and, thereby, the contour of the target object can be clearly displayed.

Moreover, the radar device of this embodiment can clearly display the contour of each target object even if two or more target objects exist as described below.

Figure 4:
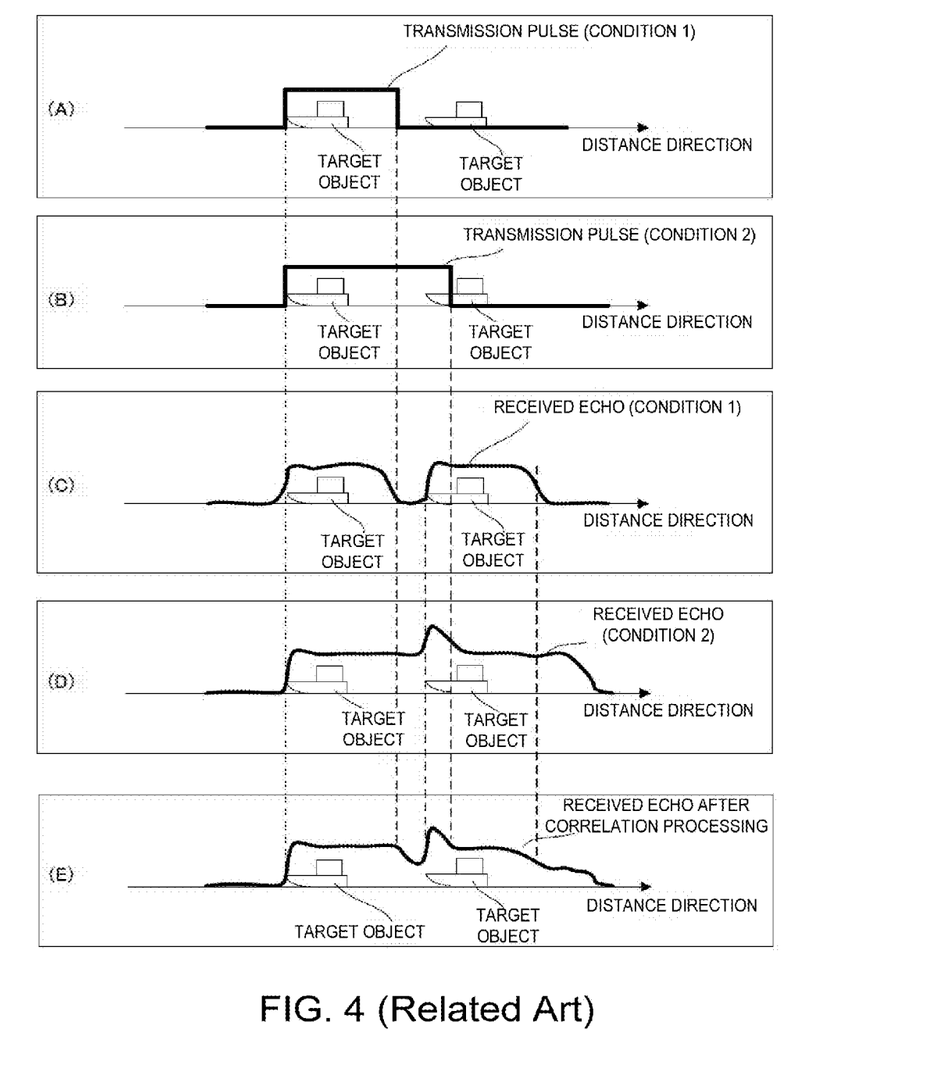
FIG. 4 is views illustrating various signals of the conventional radar device when two or more target objects exist in one transmission pulse.

FIG. 4 is views showing various signals of the conventional radar device. The conventional radar device cannot determine the existence of two or more target objects (if exist) based on the echo image in the following two cases. One case is that a transmission pulse which is shorter than a distance between target objects is outputted as shown in the part (A) of FIG. 4, and a corresponding echo signal is then received. Another case is that a transmission pulse which is longer than the distance between the target objects is outputted as shown in the part (B) of FIG. 4, and a corresponding echo signal is then received.

That is, when it is a short transmission pulse, a large echo signal with a large rising edge can be received for each target object as shown in the part (C) of FIG. 4 (condition 1). However, as shown in the part (D) of FIG. 4 (condition 2), in the case of a long transmission pulse, while an echo signal is received from the nearest target object, another echo signal is received from the next target object. The echo signals from the target objects have different phases, and the transmission pulse of one revolution before has a different pulse length or a different echo level from that of the current transmission pulse, and, therefore, it is difficult to distinguish the echo signal of the front target object and the echo signal of the rear target object. Therefore, even if the correlation processing is performed, the echo signal will have a spread in the distance direction as shown in the part (E) of FIG. 4 and thereby displaying an echo image with a spread in the distance direction (which means that there is no contour). Thus, it is impossible to determine the existence of the two or more target objects based on the echo image.

On the other hand, the present invention enables to determine the existence of the two or more target objects based on the echo image, even if the target objects are adjacent each other.

Figure 5A:
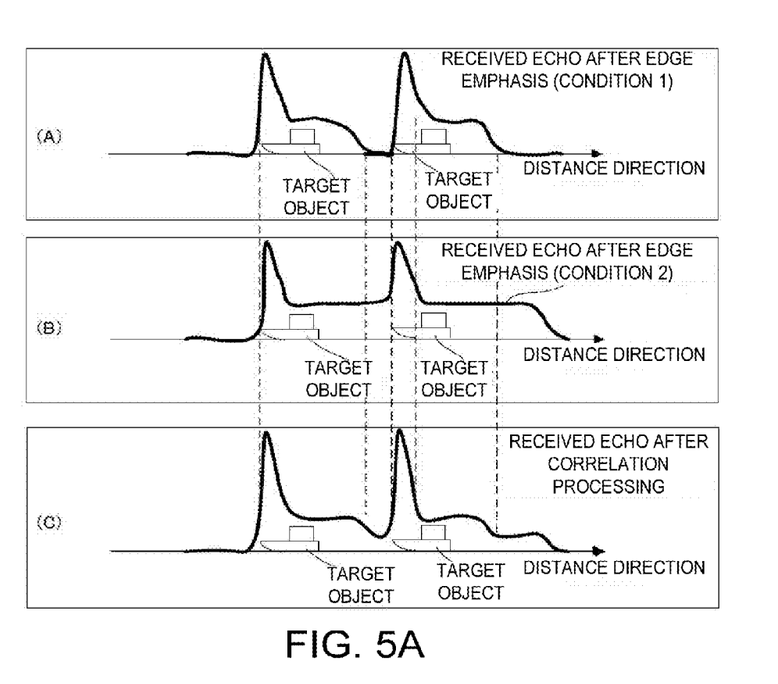
FIG. 5A is views illustrating various signals of the radar device of this embodiment when two or more target objects exist in one transmission pulse.
Figure 5B:
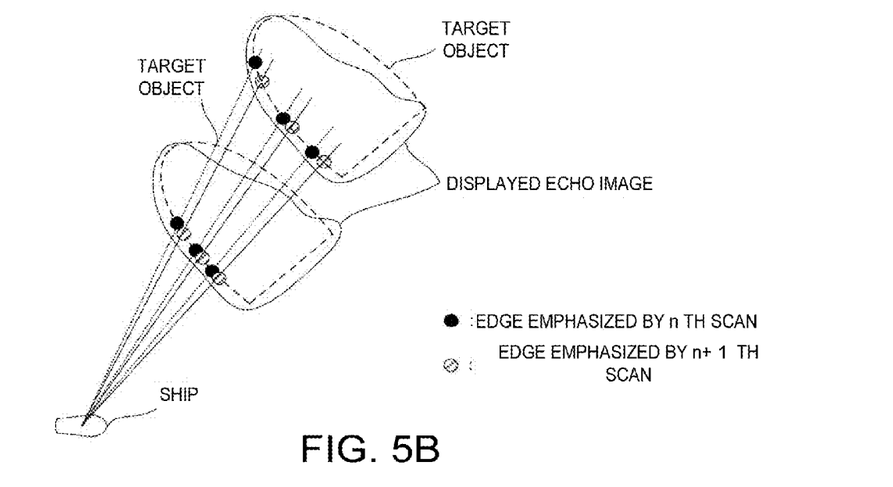
FIG. 5B is a schematic diagram showing the echo images of the radar device.

FIG. 5A is views illustrating various signals of the radar device of this embodiment when two target objects are relatively close each other, and FIG. 5B is a schematic diagram showing the echo images of the radar device. In the radar device of this embodiment, when it is a short transmission pulse, a large echo signal with a large rising edge can be received for each target object as shown in the part (A) of FIG. 5 (condition 1). Both of two target object images are clearer than the conventional radar because of an edge emphasis processing.

In addition, even if a transmission pulse is long and both of the target objects exist in the pulse (condition 2), both of two target object images can be distinguished because of an edge emphasis processing. Therefore, even if the conditions of the transmission pulse change and the echo signal of the rear target object is received as shown in the part (A) and the part (B) of FIG. 5, a portion of each target object near the ship is emphasized by the edge emphasis processing, and can clearly be distinguished.

Furthermore, the spread in the distance direction can be suppressed by performing the scan-to-scan correlation processing as shown in the part (C) of FIG. 5. Therefore, the spread (blur) in the distance direction resulting from the conditions of the transmission pulse can be suppressed as shown in the part (D) of FIG. 5, the contour of each target object can be clearly displayed and the existence of the two or more target objects can be determined based on the echo image.

Figure 6A:
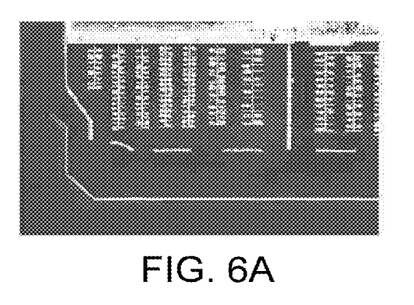
FIG. 6A is an actual satellite photograph.
Figure 6B:
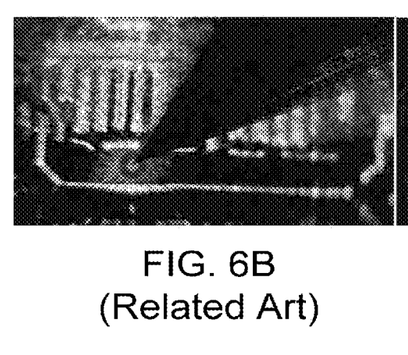
FIG. 6B is a radar image when conventional scan-to-scan correlation processing is performed.
Figure 6C:
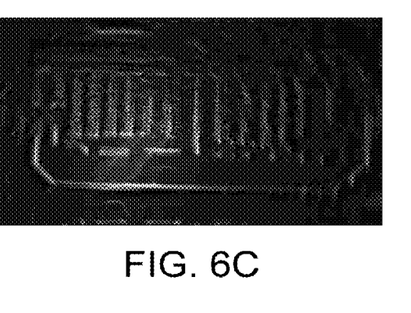
FIG. 6C is a radar image when scan-to-scan correlation processing of this embodiment is performed.

FIG. 6A are views showing an actual satellite photograph and radar images, in a situation where many ships at anchor exist (other than the ship concerned). FIG. 6A shows an actual satellite photograph. FIG. 6B is a radar image when the conventional scan-to-scan correlation processing is performed, and FIG. 6C is a radar image when the scan-to-scan correlation processing of this embodiment is performed. As shown in these drawings, since a spread (blur) occurs in the distance direction by the conventional scan-to-scan correlation processing, the ships at anchor, piers, quays and the like become collapsed echo images.

On the other hand, by the radar device of this embodiment, since the edge of each target object is emphasized and other portions are suppressed, the spread (blur) resulting from transmission pulse length is eliminated, and, thereby the ships at anchor, piers, quays and the like become non-collapsed echo images.

Moreover, according to the radar device of this embodiment, since parts where the level rises gently in the distance direction, such as rain clutters are also suppressed by the differentiation processing, important information, mainly in terms of collision prevention (i.e., actual obstacles) can be displayed as echo images.

Figure 7:
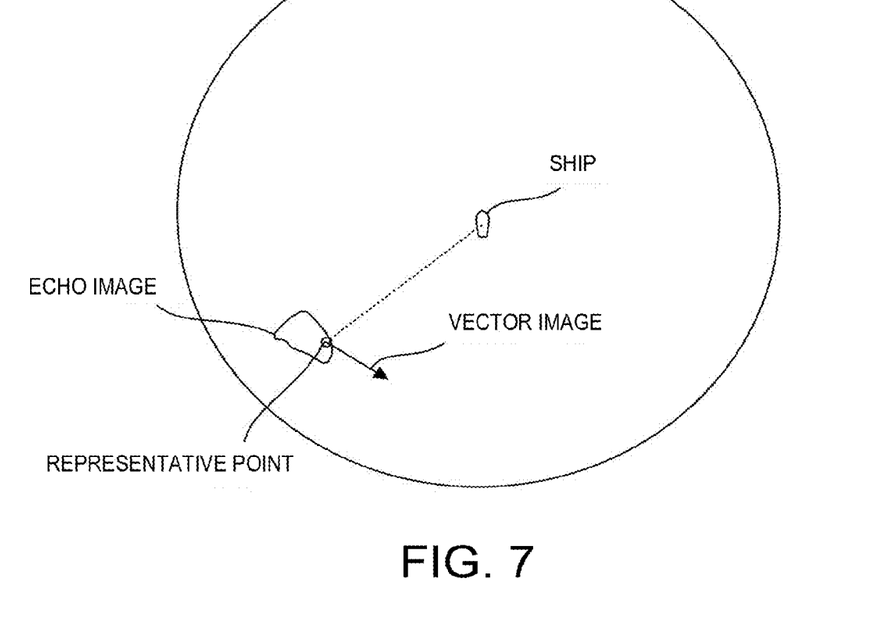
FIG. 7 is a schematic diagram showing a representative point of a collision prevention aiding device.

If using this radar device as a collision prevention aiding device, for example, as shown in FIG. 7, a representative point is determined out of the echo image indicating a target object, and a vector image indicating a moving direction and an amount of movement (speed) of the target object from the representative point is displayed. In order to obtain the representative point, a technique in which a position nearest to the ship is set to the representative point, or a technique in which a position of the center of gravity of the target object is set to the representative point, may be used.

However, since both the techniques calculate the position based on the echo image, they cannot correctly obtain the representative point based on the echo image which is spread in the distance direction. For this reason, if the representative point is calculated based on the echo image for which the spread in the distance direction is suppressed like this embodiment, the representative point can be stably obtained and an echo image which is very useful for the collision prevention aiding device can be displayed.

The edge emphasis processing is not limited to the example described above (the weighting by differentiation processing). For example, the above edge emphasizing or the following edge extraction may be performed only when the differentiation data exceeds a predetermined threshold. That is, the edge emphasis coefficient $\mu$ is obtained by the following expressions.

if $d(t) \geq$ threshold then, $\mu=1.0$ if $d(t) <$ threshold then, $\mu=0.0$

Figure 8A:
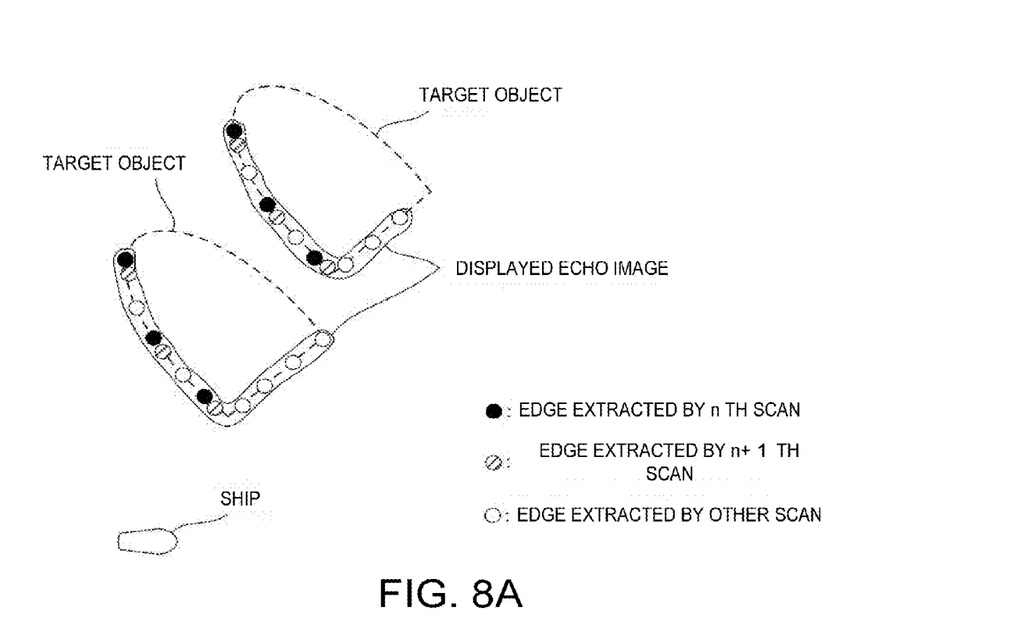
FIGS. 8A and 8B are schematic diagrams showing echo images according to other examples.

In this case, in the part where each value of the differentiation is more than a threshold predetermined data, the measurement data is left as it is, and in other parts, the measurement data is set to 0. Therefore, only the edge portion can be extracted. Note that, in this case, the processing by the differential processing module 16 shown in FIG. 1 is not necessary. In this case, the correlation processing module 17 calculates a correlation between the data in which only the edge portion inputted from the edge emphasis processing module 15 is extracted and the past data read from the image memory 18. As a result, as shown in FIG. 8A, the echo image in which only the portion of the contour of each target object near the ship is extracted is displayed. In this case, since the distance resolution becomes $d=c \cdot Ts/2$, if the sampling period Ts is made shorter than the transmission pulse length, a high distance resolution can be achieved without being influenced by the conditions of the transmission pulse. Moreover, since the position of the contour of the target object near the ship is very important information also in terms of the collision prevention, the effect of only the contour being clearly displayed is very large.

Figure 8B:
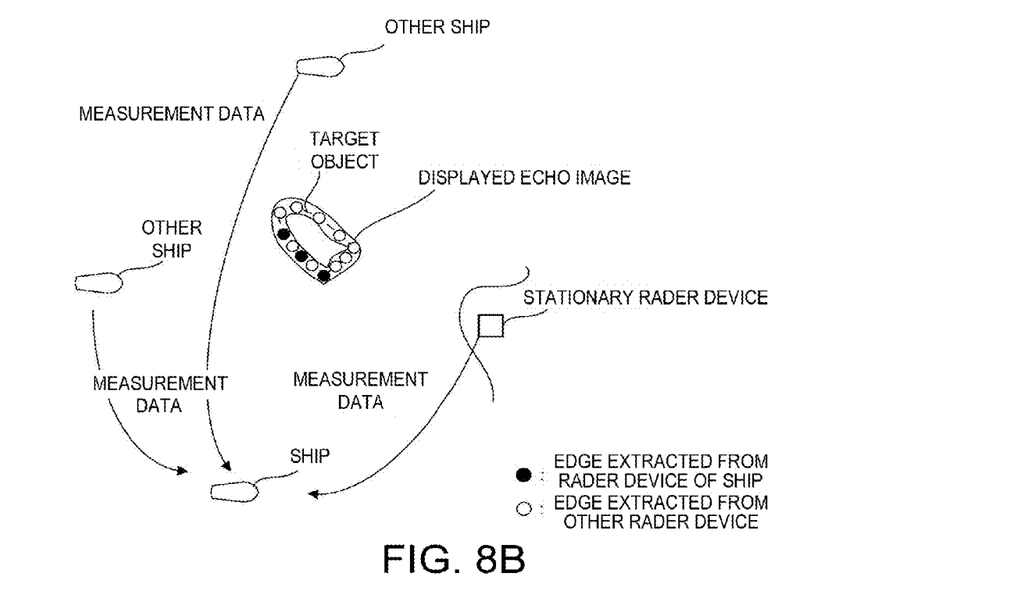

Moreover, in the example described above, only the measurement data of the radar device installed in the ship is inputted, and the edge extraction (or the weighting by differentiation) and the scan-to-scan correlation processing are performed. However, as shown in FIG. 8B, the measurement data may be received from a radar device of another ship or a stationary radar device on the ground, and the edge extraction and the scan-to-scan correlation processing of this received measurement data may be performed. In this case, since the edge of all directions can be extracted, the echo image which correctly indicates the shape of the target object can be displayed.

In this embodiment, echo data for which the edge emphasis processing is not performed may be stored in the image memory (or other memory), and the scan-to-scan correlation processing may be performed between the data after the edge emphasis processing and the past echo data for which the edge emphasis processing is not performed.

Alternatively, the correlation processing may be performed between the measurement data for which the weighting by the differential value is performed and the measurement data for which the processing for extracting the edge portion is performed. In this case, both the weighting and the edge extraction by the differential value are performed for every scan, measurement data after either processing is stored in the memory as the past data, and the scan-to-scan correlation is then performed.

As described above, the radar device of this embodiment calculates the correlation value of the echo signal of two or more scans using the edge emphasis processing data and, thus, modes in which any of the following processing may be performed:

(1) a correlation between two edge-extracted data (a correlation between current edge-extracted data and past edge-extracted image data);

(2) a correlation between data from which the edge portion is extracted and data for which the weighting by the differential value is performed;

(3) a correlation between data from which the edge portion is extracted and data for which the edge emphasis processing is not performed;

(4) a correlation between two data for which the weighting by the differential value is performed (a correlation between the current data for which the weighting by the differential value is performed and the past image data); and (5) a correlation between data for which the weighting by the differential value is performed and past data for which the edge emphasis processing is not performed.

For example, if the correlation between the two edge-extracted data is used, only the contour will be clearly displayed and, thus, a radar image with the highest resolution can be obtained. On the other hand, if the correlation between the weighted data and the past data for which the edge emphasis processing is not performed is used, a radar image close to the shape of an actual target object can be displayed (i.e., a radar image in which the spread in the distance direction is left to some extent).

Alternatively, it may be configured to allow a user to select from these processing. For example, it may be set to normally perform the scan-to-scan correlation between the two weighted data, and when the two or more target objects approach very close to the ship, the correlation between the two data from which the edge portion is extracted may be selected. Therefore, an echo image which is easy to view by the user can be displayed depending on the situation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. An echo signal processing device, comprising:
    an echo signal input module to which an echo signal from an antenna for discharging an electromagnetic wave to a predetermined area and receiving an echo signal reflected on a target object is inputted;
    an echo signal level detector that outputs a level of the echo signal from every location so as to associate the level with a distance from the antenna in a direction where the electromagnetic wave is discharged;
    a level change degree calculator that calculates a degree of change in the level of the echo signal from mutually adjacent locations among all the locations concerned; and
    an edge emphasis processor that performs edge emphasis processing for the level of the echo signal in the direction based on the degree of change and outputs an edge-emphasized echo signal.

2. The echo signal processing device of claim 1, further comprising:
    a correlation processor that performs scan-to-scan correlation processing to calculate a correlation value of the echo signals of two or more scans using the edge-emphasized echo signals, where the echo signals from the entire predetermined area is used as one scan.

3. The echo signal processing device of claim 2, wherein the scan-to-scan correlation processing includes processing to calculate the correlation value of the echo signals based on a correlation between a first echo signal caused by the electromagnetic wave discharged from the antenna at a first time point, and the edge-emphasized echo signal outputted from the edge emphasis processor for the level of the echo signal observed as an observation signal at substantially the same location as the first echo signal, caused by the electromagnetic wave discharged from the antenna at a second time point different from the first time point.

4. The echo signal processing device of claim 2, wherein the scan-to-scan correlation processing includes processing to calculate the correlation value of the echo signals based on a correlation between a first edge-emphasized echo signal outputted from the edge emphasis processor for a level of a first echo signal caused by the electromagnetic wave discharged from the antenna at a first time point, and a second edge-emphasized echo signal outputted from the edge emphasis processor for the level of the echo signal observed as an observation signal at substantially the same location as the first echo signal, caused by the electromagnetic wave discharged from the antenna at a second time point different from the first time point.

5. The echo signal processing device of claim 2, further comprising a memory that stores an output signal from the correlation processor;
wherein the scan-to-scan correlation processing includes processing to calculate the correlation value of the echo signals based on a correlation between a first edge-emphasized echo signal outputted from the edge emphasis processor for the level of a first echo signal caused by the electromagnetic wave discharged from the antenna at a first time point, and a signal after the past scan-to-scan correlation processing stored in the memory.

6. The echo signal processing device of claim 2, wherein the scan-to-scan correlation processing includes processing to calculate the correlation value of the echo signals based on a correlation between a first echo signal caused by the electromagnetic wave discharged from the antenna at a first time point, and the edge-emphasized echo signal outputted from the edge emphasis processor for the level of the echo signal observed as an observation signal at substantially the same location as the first echo signal, caused by the electromagnetic wave discharged from the antenna at a second time point different from the first time point.

7. The echo signal processing device of claim 2, wherein the scan-to-scan correlation processing includes processing to calculate the correlation value of the echo signals based on a correlation between a first edge-emphasized echo signal outputted from the edge emphasis processor for a level of a first echo signal caused by the electromagnetic wave discharged from the antenna at a first time point, and a second edge-emphasized echo signal outputted from the edge emphasis processor for the level of the echo signal observed as an observation signal at substantially the same location as the first echo signal, caused by the electromagnetic wave discharged from the antenna at a second time point different from the first time point.

8. The echo signal processing device of claim 2, further comprising a memory for storing an output signal from the correlation processor;
wherein the scan-to-scan correlation processing includes processing to calculate the correlation value of the echo signals based on a correlation between a first edge-emphasized echo signal outputted from the edge emphasis processor for the level of a first echo signal caused by the electromagnetic wave discharged from the antenna at a first time point, and a signal after the past scan-to-scan correlation processing stored in the memory.

9. The echo signal processing device of claim 2, wherein the degree of change in the echo signal is a difference of the levels of the echo signals at mutually adjacent locations.

10. The echo signal processing device of claim 2, wherein the degree of change in the echo signal is a differential value calculated by differentiating to an envelope formed of the level of the echo signal, with respect to a direction.

11. The echo signal processing device of claim 2, the degree of change in the echo signal is a value calculated by weighted addition processing for the level of the echo signal at the location concerned and its surrounding locations.

12. The echo signal processing device of claim 2, wherein the edge emphasis processing includes processing for multiplying the level of the echo signal of each of the locations by a coefficient determined based on the degree of change.

13. The echo signal processing device of claim 2, wherein the edge emphasis processing is performed when the degree of change in the echo signal exceeds a predetermined threshold.

14. The echo signal processing device of claim 2, further comprising a display that displays an image of the target object based on an output signal of the correlation processor.

15. A radar device, comprising:
the echo signal processing device of claim 2; and
the antenna for rotating while discharging the electromagnetic wave and receiving the echo signal for every direction.

16. A radar device, comprising:
the echo signal processing device of claim 14; and
the antenna for rotating while discharging the electromagnetic wave and receiving the echo signal for every direction.

17. A method of processing an echo signal, comprising:
inputting an echo signal from an antenna for discharging an electromagnetic wave to a predetermined area and receiving an echo signal reflected on a target object;
outputting a level of the echo signal from every location so as associate the level with a distance from the antenna in a direction where the electromagnetic wave is discharged;
calculating, with a processor, a degree of change in the level of the echo signal from mutually adjacent locations among all the locations concerned; and
performing, with a processor, edge emphasis processing for the level of the echo signal in the azimuth direction based on the degree of change and outputting an edge-emphasized echo signal.

18. A method of processing an echo signal of claim 17, further comprising:
performing, with a processor, scan-to-scan correlation processing to calculate a correlation value of the echo signals of two or more scans using the edge-emphasized echo signals, where the echo signals from the entire predetermined area is used as one scan.

19. A non-transitory computer-readable medium having embodied thereon instructions representing an echo signal processing program, which, when executed by a processor, causes the processor to perform steps comprising:
inputting an echo signal from an antenna for discharging an electromagnetic wave to a predetermined area and receiving an echo signal reflected on a target object;
outputting a level of the echo signal from every location so as to associate the level with a distance from the antenna in an azimuth direction where the electromagnetic wave is discharged;
calculating a degree of change in the level of the echo signal from mutually adjacent locations among all the locations concerned; and
performing edge emphasis processing for the level of the echo signal in the direction based on the degree of change and outputting an edge-emphasized echo signal.

20. The medium of claim 19, the steps further comprising:
performing scan-to-scan correlation processing to calculate a correlation value of the echo signals of two or more scans using the edge-emphasized echo signals, where the echo signals from the entire predetermined area is used as one scan.

21. The device of claim 1, where the edge emphasis processor selects an edge area of the target object for emphasis based on the degree of change and performs edge emphasis processing on the selected edge area.

22. The method of claim 17, said performing edge emphasis processing including selecting an edge area of the target object for emphasis based on the degree of change and performing edge emphasis processing on the selected edge area.

* * * * *